(12) United States Patent
Wilson et al.

(10) Patent No.: US 8,931,001 B2
(45) Date of Patent: *Jan. 6, 2015

(54) SYSTEM AND METHOD FOR DISTRIBUTING VIDEO DATA OVER AN ELECTRICAL POWER LINE

(75) Inventors: Brian B. Wilson, Liberty, MO (US); Roger A. Cockrell, San Antonio, TX (US); Steven M. Wollmershauser, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,022

(22) Filed: Jun. 29, 2012

(65) Prior Publication Data

US 2013/0007804 A1 Jan. 3, 2013

Related U.S. Application Data

(63) Continuation of application No. 12/251,549, filed on Oct. 15, 2008, now Pat. No. 8,212,883.

(51) Int. Cl.
*H04N 5/445* (2011.01)
*H04B 3/54* (2006.01)

(52) U.S. Cl.
CPC ........ *H04B 3/546* (2013.01); *H04B 2203/5433* (2013.01); *H04B 2203/5445* (2013.01); *H04B 2203/545* (2013.01); *H04B 2203/5458* (2013.01)
USPC ...................... 725/42; 348/211.8; 348/211.11; 725/108

(58) Field of Classification Search
USPC ................................ 725/12, 78, 42, 108, 106
See application file for complete search history.

(56) References Cited

U.S. PATENT DOCUMENTS

| | | | |
|---|---|---|---|
| 5,801,770 A | 9/1998 | Paff et al. | |
| 6,709,172 B2 | 3/2004 | Brown | |
| 7,451,473 B2* | 11/2008 | Kawabe et al. | 725/108 |
| 2002/0109770 A1* | 8/2002 | Terada | 348/14.08 |
| 2004/0117845 A1* | 6/2004 | Karaoguz et al. | 725/134 |
| 2004/0172657 A1* | 9/2004 | Phillips et al. | 725/110 |
| 2005/0018766 A1* | 1/2005 | Iwamura | 375/240.01 |
| 2005/0071883 A1* | 3/2005 | Oh | 725/108 |
| 2005/0246757 A1* | 11/2005 | Relan et al. | 725/135 |
| 2005/0267605 A1* | 12/2005 | Lee et al. | 700/19 |
| 2006/0017324 A1* | 1/2006 | Pace et al. | 307/3 |
| 2006/0171453 A1* | 8/2006 | Rohlfing et al. | 375/240.01 |
| 2006/0294565 A1* | 12/2006 | Walter | 725/108 |
| 2007/0083896 A1* | 4/2007 | Staples | 725/58 |
| 2007/0180482 A1* | 8/2007 | Frink et al. | 725/105 |
| 2007/0199032 A1* | 8/2007 | Renkis | 725/105 |

* cited by examiner

*Primary Examiner* — Pankaj Kumar
*Assistant Examiner* — Timothy Newlin
(74) *Attorney, Agent, or Firm* — G. Michael Roebuck

(57) ABSTRACT

A non-transitory tangible computer readable medium is disclosed, containing a computer program for distributing video data over an electrical power line, the computer program including but not limited to instructions to receive first video data and second video data concurrently at a first internet protocol television client device over an electrical power line from a second and third controllable devices in response to the detecting the first event data in the first location at the first controllable device; instructions to create at a first client end user device, a client created internet protocol television channel and insert the client created channel into an existing electronic program guide for the first and second video data; and instructions to send the electronic program guide to a second client end user device for selection and display of the first and second video concurrently at a display for the second client end user device.

19 Claims, 12 Drawing Sheets

SYSTEM AND METHOD FOR DISTRIBUTING VIDEO DATA OVER AN ELECTRICAL POWER LINE

CROSS REFERENCE TO RELATED APPLICATIONS

The patent application is a continuation of and claims priority from U.S. patent Ser. No. 12/251,549 filed on Oct. 15, 2008 now U.S. Pat. No. 8,212,883 Entitled A System and Method for Distributing Video Data Over an Electrical Power Line by Brian Wilson, Roger A. Cockrell and Steven M. Wollmershauser which is hereby incorporated herein by reference in its entirety.

BACKGROUND

1. Field of Disclosure

The disclosure relates to the field of video data distribution systems.

2. Description of the Related Art

Many home automation systems use coaxial cabling, cat5 or other media to distribute and transport data. In many cases, the use of such cabling requires extensive installation effort and expense. In some cases the cabling supplies data to a graphical user interface (GUI) display device, processor, and a remote control to access the home automation system GUI. The GUI is stored locally on the processor to provide access to home automation and security features via the cabling system. Current home automation systems may use elaborate cabling systems to communicate with specialized controllers, expensive liquid crystal display (LCD) panels, and media centers. Many existing home automation systems and controllers use extensive, complex programming only available through on-site or remote service.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF THE DISCLOSURE

Figure 1:
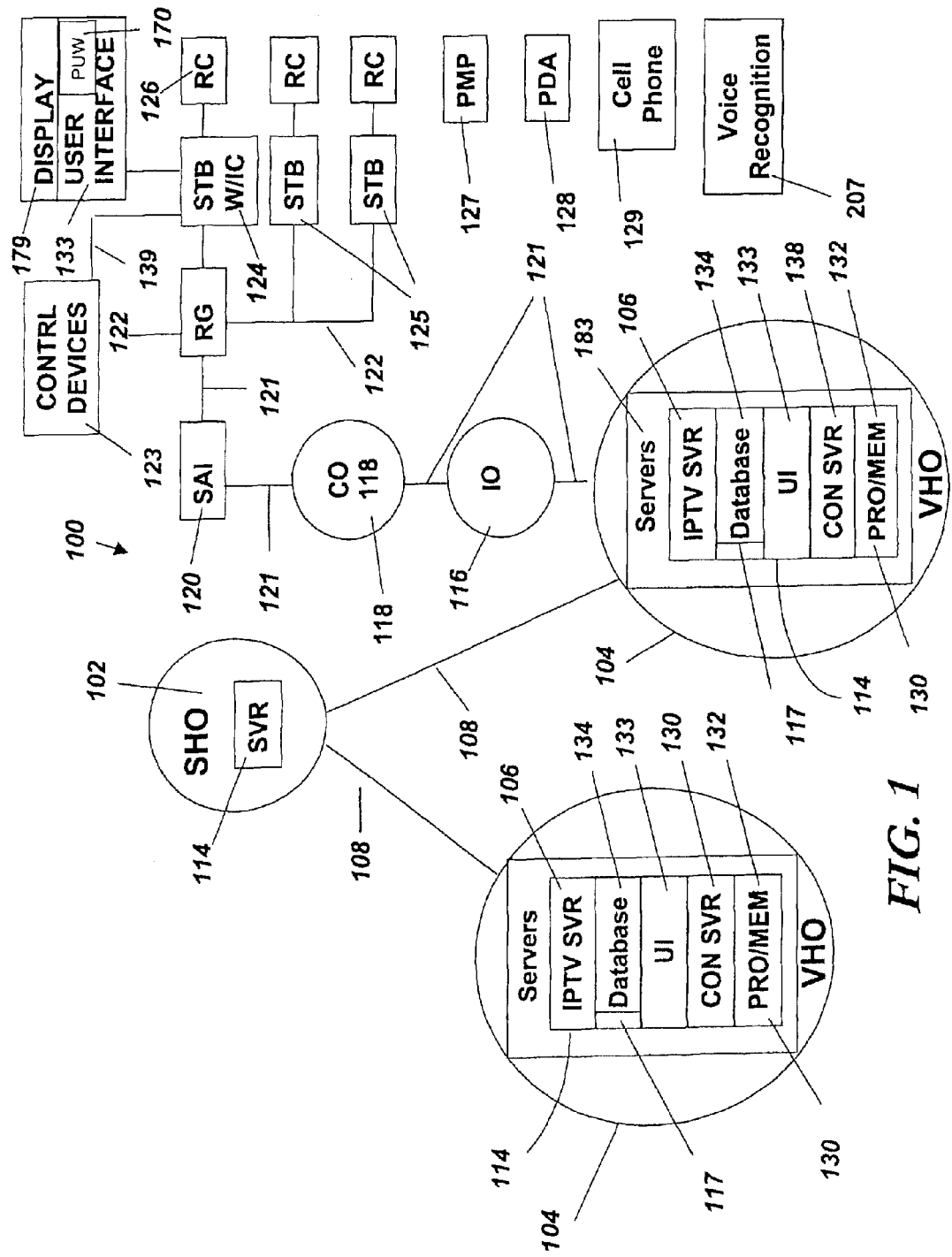
FIG. 1 is a schematic diagram depicting of an illustrative embodiment showing an Internet protocol television (IPTV) network.

This present disclosure describes a system and method that utilizes the power line system in the premises to distribute and transport data. The system and method substantially reduce the need to use coax, cat5 or other media to distribute and transport the data. In an illustrative embodiment, cameras require are plugged into a power outlet. Using "Home Plug" or other power line protocols with sufficient bandwidth to transport video is an efficient method to delivery video over an existing power line in the premises. The video can be extracted at a gateway device or internet protocol television (IPTV) client device such as a set top box (STB) for distribution to other IPTV client devices. An illustrative embodiment provides a relatively easy installation method and utilizes existing electrical power wiring in the premises. The camera is plugged into an electrical power line to operate and using that electrical power line data transmission, including but not limited to video data transmission, substantially eliminates a need for coax, phone line, cat5 and other physical medium that would require installation and additional cost over and above the existing electrical power wiring. Also, an illustrative system and method reduce the need to provide power over cat5 or other medium to power the camera that also reduces cost.

A particular illustrative embodiment allows plug in play installation of cameras, requires no additional wiring or medium, reduces cost, is more reliable than wireless cameras, leverages existing hardware on the premises, and substantially reduces the need to power cameras over coax, cat5 or another medium. An illustrative system and method effectively utilize the power line system and advanced home networking protocols over an electrical power line for the distribution of data between controllable devices, including but not limited to the video from the camera. Another particular illustrative embodiment integrates with other power line networking protocols such as controllable device such as home entertainment video/audio, STB, DVR, Personal media contact and more. Another particular illustrative embodiment essentially leverages existing power line protocols such as HOME PLUG™ and other power line technologies that incorporate high bandwidth solutions. A particular illustrative embodiment provides an existing gateway or STB to extract and access data originating from the controllable devices, including the video data.

In another particular embodiment, a computer readable medium is disclosed containing instructions embedded in the computer readable medium that when executed by a processor are useful in performing a method for distributing video data over an electrical power line, the method including but not limited to detecting first event data at a first controllable device in an internet protocol television system; sending second event data over the electrical power line to a second controllable device in the internet protocol television system from the first controllable device in response to the detecting the first event data at the first controllable device; and receiving video data concurrently at a first internet protocol television client device over the electrical power line from the first and second controllable devices in response to the detecting the first event data at the first controllable device.

In another embodiment of the medium, the method further includes but is not limited to displaying concurrently the video data from the first and second controllable devices on a display at the first internet protocol client device. In another embodiment of the medium, the first controllable device and the second controllable device send video data to the first internet protocol client device in response to the detecting the first event data. In another embodiment of the medium, the first and second controllable devices are video cameras, the method further includes but is not limited to inserting at the first internet protocol client device, the video data received from the first and second controllable devices into a client-generated internet protocol television channel; and inserting client-generated listing data for the video data from the first and second controllable devices into client-generated internet protocol television electronic program guide data.

In another embodiment of the medium, the method further includes but is not limited to sending the client-generated electronic program guide data to a second internet protocol television system client device from the first internet protocol television system client device; receiving channel selection data from the second internet protocol television system client device at the first internet protocol television system client device, wherein the channel selection data indicates the client-generated internet protocol television channel data; and sending the video data from the first and second controllable devices in the internet protocol television channel to the second internet protocol television system client device. In another embodiment of the medium, the client-generated listing data further comprises context statement data describing the event detected. In another embodiment of the medium, the context statement data further comprises event activity data indicating an event activity and event location data indicating an event location.

In another embodiment of the medium, the context statement data further comprises data indicating event participant data indicating an event participant for the event activity and event location. In another embodiment of the medium, the method further includes but is not limited to inserting the client-generated electronic program data into internet protocol television system-generated electronic program guide data, wherein the internet protocol television system-generated electronic program guide data is distributed to a plurality of client devices in the internet protocol television system and the internet protocol television system-generated electronic program guide data indicates programs provided by the internet protocol television system.

In another particular embodiment, a system is disclosed for distributing video data over an electrical power line, the system includes but is not limited to a processor in data communication with a computer readable medium; and a computer program comprising instructions embedded in the computer readable medium, the computer program further comprising instructions to detect first event data at a first controllable device in an internet protocol television system; instructions to send second event data over the electrical power line to a second controllable device in the internet protocol television system from the first controllable device in response to the detecting the first event data at the first controllable device; and instructions to receive video data concurrently at a first internet protocol television client device, over the electrical power line from the first and second controllable devices in response to the detecting the first event data at the first controllable device.

In another embodiment of the system, the computer program further includes but is not limited to instructions to display concurrently the video data from the first and second controllable devices on a display at the first internet protocol client device. In another embodiment of the system, the first controllable device and the second controllable device send video data to the first internet protocol client device in response to the detecting the first event data. In another embodiment of the system, the first and second controllable devices are video cameras, the computer program further comprising instructions to insert at the first internet protocol client device, the video data received from the first and second controllable devices into a client-generated internet protocol television channel; and instructions to insert client-generated listing data for the video data from the first and second controllable devices into client-generated internet protocol television electronic program guide data.

In another embodiment of the system, the computer program further includes but is not limited to instructions to send the client-generated electronic program guide data to a second internet protocol television system client device from the first internet protocol television system client device; instructions to receive channel selection data from the second internet protocol television system client device at the first internet protocol television system client device, wherein the channel selection data indicates the client-generated internet protocol television channel data; and instructions to send the video data from the first and second controllable devices in the internet protocol television channel to the second internet protocol television system client device. In another embodiment of the system, the client-generated listing data further comprises context statement data describing the event detected. In another embodiment of the system, the context statement data further comprises event activity data indicating an event activity and event location data indicating an event location. In another embodiment of the system, the context statement data further comprises data indicating event participant data indicating an event participant for the event activity and event location. In another embodiment of the system, the computer program further includes but is not limited to instructions to insert the client-generated electronic program data into internet protocol television system-generated electronic program guide data, wherein the internet protocol television system-generated electronic program guide data is distributed to a plurality of client devices in the internet protocol television system and indicates programs provided by the internet protocol television system.

In another particular illustrative embodiment, a video camera is activated and distributes video data without installing additional cabling. Many video cameras require additional wiring for installation. Wireless video cameras are often not reliable based on their usage of unlicensed 2.4 GHz frequency. In an illustrative embodiment, video data is extracted at a gateway or STB device for distribution and accessing the video. In view of the above, an illustrative embodiment is presented through one or more of its various aspects to provide one or more advantages, such as those noted below. In one embodiment a method is presented for configuring device state data for a home automation controllable device including accessing user interface (UI) data from a database at a server, sending the UI data from the server to a client device, receiving data representing a user input to the UI from the client device at the server, configuring the device state data in the database in accordance with the user input, and sending the configured device state data to the client device. The client device may be integrated into an IPTV client device, such as a set top box (STB) as shown in FIGS. 1-4 herein. While embodiments dealing with homes are disclosed herein, it should be understood that the techniques are applicable in other environments including but not limited to businesses, schools and other environments wherein consumer electronic devices can be controlled as controllable devices. The STB is an example of an illustrative IPTV client device integrated with a integrated client agent (ICA A described below) that functions as a device controller. Some if not all of the controllable devices are also integrated with a controllable device agent (CDA), including an integrated processor in data communication with an integrated computer readable medium for containing data for processing by the integrated processor and computer program instructions data executed by the processor. The CDAs detect events and reporting detected events via data messages sent to other controllable devices and to an ICA in an IPTV client device. In an illustrative embodiment, video cameras include integrated motion detectors.

In a particular embodiment, a system and method for interacting with a controllable device agent in an IPTV system is disclosed. Each controllable device incorporates a controllable device agent implemented in firmware. The controllable device agent is in data communication with other controllable device agents on the premises and IPTV client devices in the IPTV system, such as an on-premises STB.

In another aspect of a particular embodiment a controllable device having controllable device agent can include but is not limited to a telephone, media server, security system, lighting, ventilation, air conditioning thermostat, video systems, audio systems, window coverings, attic vent fans, automated doors, gates, locks, energy management system, automated fountain, water heaters, sprinklers, pools, spas, video cameras, automated appliances, water leakage detectors, vehicle detection systems, hurricane shutters, security shutters, weather station, utility monitoring devices, automated fireplaces and automated ceiling fans. In another aspect of a particular embodiment an illustrative system and method further include sending video data to an IPTV server and sending the video data from the IPTV server to a monitoring service such as fire, police or a private monitoring service.

In a particular illustrative embodiment a system and method are provided to configure controllable devices in a home and distribute data between controllable devices in a home and an IPTV client device in the home and between an IPTV client device inside of the home and an IPTV client device outside of the home. A particular illustrative embodiment includes but is not limited to a client device such as a set-top box (STB) with an integrated client (IC) for monitoring and controlling a device state for a group of controllable devices for performing home automation and distributing data between the controllable devices. The terms STB and ICA are used interchangeably herein to mean an STB with an IC. The ICA can communicate through any suitable gateway, such as an integrated residential gateway (RG) to access a server hosting an internet protocol television (IPTV) server. The term IPTV is used herein to describe a digitized television signal set over a digital network such as the Internet television over internet protocol (TVoIP). As an example of TVoIP, the IPTV example of the illustrative embodiment is used as a non limiting example of an illustrative embodiment system for providing TVoIP or IPTV. IPTV is not intended to limit the disclosure to any specific implementation of a system for providing digital television and video delivered over the internet or TVoIP. The terms IPTV and TVoIP are used herein interchangeably. The present description or disclosure is not limited to any particular vendor's implementation of IPTV or TVoIP, including but not limited to a Microsoft Corporation implementation of digital television delivered over the internet.

A residential gateway (RG) is shown in an illustrative embodiment, however, any data device such as a gateway that provides data communication between the IPTV client device with an ICA and the servers 106, 138, 114 and 133, is suitable, including but not limited to commercial, industrial, multiple dwelling unit and office gateways. IPTV user interface (UI) data is provided for formatting the UI at a client and presentation of electronic program guide, client-generated EPG listings, client-generated video data, context descriptions, device state data and home automation data at the client is stored at a database accessible to an IPTV server 106. Home automation controllable devices 123 (herein after "controllable devices") operational states are represented in a device state data structure stored in a database at a control server 138. The ICA monitors and receives the device state data from the control server for all controllable devices in a home. The ICA controls the controllable devices via the controllable device clients, setting them to the device settings in the device state data.

The ICA communicates with the IPTV server and control server through an integrated interface or through an interface such as RG 122. The RG 122 can be integrated into ICA STB 124. The device state for the controllable devices can be configured and controlled by a subscriber through the UI. The UI may be displayed on a television set or a computer through the RG or STB or at remote devices away from the home, such as all phone, PDA and laptop. Multiple UI formats and device state data sets for a number of client devices are stored in the data base. Thus the UI can be sent to multiple IPTV client devices and the device state data presented on multiple clients. The UI format for a cell phone could be different the format for a television or PC. The device state data presented in the UI format may change between client devices. The UI enables a subscriber to monitor and control the operational state of existing home automation controllers, devices, and security systems from a client device such as the ICA or a remote cell phone. The IPTV client devices also receive IPTV video data, client-generated video data, device monitoring data and video streams.

In an illustrative embodiment the ICA communicates with the existing controllable devices in the home through existing home wiring, or power-line technology, such as HOME PLUG™ and UPB™, other communication networks and protocols can be used including X10, Zigbee, ultra wide band (UWB) and Insteon. The ICA controls the states of the controllable devices according to the device state data by sending control commands to the controllable devices to turn on lights or stream video data from a front porch video camera when the door bell rings.

A system according to the illustrative embodiment can be inexpensively installed and thus is affordable to the average homeowner. The system of the illustrative embodiment can save consumers thousands of dollars in installation costs compared to installation of elaborate home automation systems. The illustrative embodiment is network based and thus enables transparent software upgrades and remote service transparent to a subscriber enabling service without disrupting a subscriber's household for maintenance and upgrades. The illustrative embodiment provides an easy, convenient method for home automation, content selection and security. Home automation programming is provided through simplified UI control at the server with built-in computer program applications. The illustrative embodiment provides server based computer programs that can provide reporting, analysis, performance, environmental control and evaluation of usage of controllable devices.

The illustrative embodiment provides an IPTV and control server based home automation system. UI data is provided that resides on a database accessible to the control server 138 and the IPTV server 106. An ICA and user remote control (RC) are provided to enable the user to use the RC to provide input to and communicate with the UI through the ICA to alter UI data and the device state data via the CDA. The UI data is displayed on an IPTV UI format display such as on a television or on a mobile display device such as a cell phone. A subscriber can conveniently access the UI data through the formatted UI presentation of the UI data on a display screen to control home automation and content from the comfort of their home sofa or from a remote location via a laptop computer, cell phone or PDA. The UI can be accessed from the ICA via an integrated RG through any STB or television RC location in the home. The UI can also be accessed remotely through the control server by remote devices through Wi-Fi, local or remote wireless networks. The UI data can be accessed by numerous other client devices in and away from the home including but not limited to personal media players (PMP), advanced remote controls, LCD's, lap-top computers, personal computers, and verbal input through a voice recognition system.

The control server 138 processes remote device user input data from a UI presented at the remote device and communicates the data to the IPTV server, control and ICA per the input data. UI input from a remote device are reflected in the UI and the device state data. For example, a user at a cell phone can request turning on the heat at a cell phone UI. The control server accepts the UI input from and changes the device state in the data base to turn on the heat. The control server sends the new device state data to the ICA and formats the UI to reflect the change in the device state. The control server sends a message to the IPTV server to send the reformatted UI data for the new device state and device state data to the ICA for display as a UI screen at the client device. Remote devices communicate with the control server, IPTV server and data base via messages with the control server 138 and send data to and from with control server 138. The ICA sends device states read from the controllable devices directly to the control server and the control server sends device states for controlling the controllable devices directly to the ICA. Programming the home automation system is simplified as it is initially pre-configured with serviceable default computer programs.

Data representing a device state of the home automation controllable devices (hereinafter "device state") is stored in a database at or accessible to the control server. The device state represents an operational state for each controllable device in the home. The device state data can be configured to set controllable devices in various operational states including but not limited to, on, off, variable power or dimmer setting, volume settings, flicker, video streaming data, etc. The device state data and associated device state for controllable devices in the home can be configured using a UI iconic representation of the home controllable devices appearing in a house floor plan. In an illustrative embodiment, device states can be learned in "context". Learning a device state in context is performed by instructing the ICA to learn, that is, capture and store a particular device state data and context data representing a set of current controllable device settings (device state) for current or future context data. For example, a subscriber may configure controllable devices manually or via the UI, to turn down the lights, turn the television volume up and mute the telephones in his home as he (subscriber "dad") is watching Monday Night Football. Dad may use the UI to instruct the ICA in an illustrative embodiment to learn the device state and context for a subscriber dad watching Monday Night Football. The ICA monitors and sends the device state data to the control server for storage in the database at the control server for application of business rules to the device state and context data. The IPTV server or control can associate this device state data in the data base with a context to generate a business application of a business rule. Thus, next time dad is watching Monday night football the business rule will see that dad is watching Monday night football and send the learned device state data to the ICA to set the device state in the controllable devices.

In an illustrative embodiment, a server database is provided for storing the device states data. The device states data can be manipulated by accessing the UI. The UI resides off-site in the IPTV network server database for on-going software updates and programming. Dedicated STB remote buttons are provided for macros, such as all home lights mode on or panic mode, such as all lights flashing during an intrusion or breach of security. In this case an intrusion alert from the ICA can be sent to neighbor homes over the IPTV network and to a security monitoring agency such as police, fire and emergency medical. An advanced ICA remote control (RC) is provided for user input to the UI to access and interact with additional features and controls including but not limited to intelligent monitoring and management for energy savings, home theatre control, security control and more. A client device at the home next door can receive the client-generated EPG data from home and select client-generated video data generated by the home to view video data from the household intrusion. A remote mobile client device can receive the client-generated EPG from home and select client-generated video data generated by the home to view video data from the intrusion household.

In one particular embodiment, CDA communication interfaces are provided to existing controllable devices, home automation systems and security systems. In an illustrative embodiment the ICA can communicate with CDAS over existing home wiring using power-line or wireless technologies for changing the state of controllable devices by controlling the devices according to the device state. Controllable devices can be monitored and their device state controlled, that is, the devices can be turned on and off, variably controlled as to direction, speed and power. The illustrative embodiment provides a database for storing business rules data, content data, context data and device states data. The business rules are applied to the content, device state data and context data to reconfigure the device states in the database which are sent to the ICA for setting a device state in the controllable devices, for example, in a home or business.

In a particular embodiment a user can access the UI data to communicate with an STB with ICA having a digital video recorder (DVR) and a media server containing video, music, photos, etc. Home automation system reporting and context description and analysis are provided at the control server or the client device.

Reporting includes reporting data to the control server through the ICA on device performance, environmental factors and device usage. Usage reporting can be conducted on or by individual devices or appliances in the home including but not limited to devices such as, refrigerators, air conditioners, swimming pools and lights. Reporting can be tied to content data or context data. For example, refrigerator contents data can be inventoried by subscriber interaction at a mobile client device IAC or CDA when the mobile client device is acting as a controllable device to another IAC with the UI, such as verbal announcement to the voice recognition system or by scanning in by bar code identifying products like in a supermarket checkout line and reported to a subscriber on demand. A business rule may be configured to monitor IPTV content data and display refrigerator contents data when a commercial break is encountered during a football game.

In another particular embodiment, an end user at a mobile IPTV client device can query an IPTV electronic program guide to see what programs are scheduled as upcoming on television and concurrently query refrigerator contents to determine what additional food items an end user may want to purchase to go along with the upcoming or scheduled television event.

Washers, dryers, microwaves, heating/cooling, and pool/hot-tub usage, can be monitored, reported and controlled. A particular embodiment can provide business rules to use weather stations reports to the control server to provide weather related home automation features to change the device state to control shutters during high winds, blinds synchronized with the sun, sprinklers run according to recent cumulative rainfall, windows/ventilation systems, and temperature and humidity control to optimize energy efficiencies.

In another particular embodiment an STB with integrated client agent (hereafter referred to as "ICA" and used interchangeably with STB to mean an STB with integrated client) is provided. The ICA provides an IP based home automation solution that integrates content (entertainment video and RDP applications) with advanced home monitoring and automation control features. ICA automation features include but are not limited to controlling lighting, security, surveillance, temperature, energy management. Video content related controls include but are not limited to home theater control, diagnostics, context description and reporting capabilities. The ICA control seamlessly integrates advanced home theater control and home automation control using standard IR, IP, RF, wireless and power line communication protocols. The ICA can be integrated into an STB which can include but is not limited to an STB used for decoding CATV, IPTV, and/or Satellite video applications. The ICA leverages existing STB functionality and connectivity to consumer A/V electronics and controllable devices including access to client-generated video data, personal media content such as internal/external digital video recorder (DVR), personal video recorder (PVR), PMP or storage devices and personal computers.

An ICA is described in the illustrative embodiment which is capable of providing home automation monitoring and control, and audio/visual (A/V) control and content control to any room in the home through the ICA and a home communication network. In an illustrative embodiment, the ICA integrates infrared (IR), IEEE 1394, RS-232, radio frequency (RF), component video, composite video, S-video, DVI, HDMI, optical, Ethernet, RJ-11, audio in/out, video in/out, and speaker out connectivity to the home theater consumer electronics equipment.

In an illustrative embodiment, the ICA communicates to other STB's and home automation device CDAS throughout the home using communication networks including but not limited to a wireless mess network, Ethernet, Wi-Fi, Zigbee or power line distribution systems methods including but not limited to Zwave, universal power bus (UPB), and Insteon protocol. The ICA also communicates with and controls controllable devices, including but not limited to sensors, detectors, thermostats, outlet dimmers, outlet switches, smoke detectors, fire detection systems, video cameras, carbon monoxide detectors, contacts, proximity sensors, video cameras, security systems, gas detection devices, irrigation equipment, energy measurement, load control, air conditioning, humidity control, heating equipment, dimmer switches, switches, smart appliances, pool/spa, home theater, shades, blinds, drapes, projection screens, mounts, lifts, fan speed, remote dimmers, etc. The ICA can be accessed and controlled by remote controls, remote wireless devices, touch pads, key pads, LCD's, key fobs, PDA's, PMP's, Cell Phones, computers, etc. The ICA may access an IPTV GUI and to request to receive a device state from the control server to configure controlled devices in the home according to the device state.

Turning now to FIG. 1, FIG. 1 is a schematic diagram depicting an IPTV network 100 in accordance with an illustrative embodiment. As shown in FIG. 1, the IPTV network 100 includes but is not limited to a super hub office (SHO) 102 for acquisition and encoding of information and data such as video content; a video hub office (VHO) 104 in each demographic market area (DMA) for delivery of the content; intermediate offices (IO) 116 and central offices (CO) 118 locations in each metropolitan area for distribution of the content; a service area interface (SAI) access network between the COs and multiple or single dwelling units; and the in-home network with residential gateway (RG) 122. The SHO, VHO, IO and CO may be located in separate geographic regions (nation, region, state, metropolitan, and city) to communicate to subscribers over high-speed digital communication lines 108.

A server 114 can be placed at the SHO 102 to acquire and redistribute content to the VHOs 104 which may be spread across a large geographic region such as a country, such as the United States, England or France. The SHO may be provided in a geographically central location for acquisition of national-level broadcast TV programming. IPTV system EPG data is also distributed from the SHO or another server in the IPTV system. The SHO can be the central point of on-demand video content acquisition and insertion of content into the IPTV network. Video content may include but is not limited to all displayable visual and audio content data including but not limited to client-generated video data, movies, games and television programs. Video content can be received at the SHO 102 via satellite and processed for delivery to the VHOs 104. On demand video content can be received from various sources and processed for code/decode and bit-rate requirements for the IPTV network for transmission to the VHOs over high-speed communication links 108. Video content from a SHO server 114 can be redistributed to the VHOs 104 toward the subscriber via the intermediate offices (IOs) 116 and the central offices (COs) 118. The COs are connected to the IOs to further distribute video content data and EPG data toward the subscribers. A subscriber at a client device such as a cell phone or STB communicates with the IPTV server 106 and the ICA 124 communicates with the control server 138 over an internet protocol (IP) link 121 between ICA 124 and servers 183, IPTV server 106 and control server 138.

The VHOs 104 can receive national content from the SHO 102 video server 114. The VHOs are the video redistribution points within each designated market area (DMA) or geographic region. Application systems, regional subscriber database systems, VOD servers, and fast channel-change servers can be located in the VHO. In a particular illustrative embodiment at least one IPTV server 106 and control server 138 are placed at each VHO server. Each of the servers 114, 106, 138, 183 includes a processor 130, memory 132 coupled to the processor 130, database 134, and GUI 133. The memory 132 can include a computer program that is embedded in the memory 132 that can include logic instructions to perform one or more of the method steps described herein. Additionally the database 134 containing the device control state 117 is coupled to the processor 130.

IPTV subscriber activity data can be collected at the IPTV server 106 from all subscribers associated with a particular server at a VHO and stored in the database 134 for global analysis between multiple IPTV subscribers. Global context and alert messages can be created sent to IPTV subscribers based on a survey of subscriber activity data stored in the database from multiple RGs or IPTV subscribers.

IPTV network content data, video data and messages data, UI data and the device state data is communicated to the ICA through a gateway, such as a subscriber ICA with integrated RG 122 and can be sent at least partially via either fiber to the node (FTTN) or fiber to the premises (FTTP) optical communication links. In another embodiment, other communication links between the ICA and the servers are provided which are suitable including wireless or any other communication mode that may be suitable for transmission of video and data over a communication network including but not limited to an IP network. FTTN equipment, located at communication interface such as a serving area interface (SAI), can be connected to the CO. FTTN equipment may also be located in the CO. Toward the subscriber household, a network interface device (NID) and integrated RG 122 with a built-in very high data rate digital subscriber line (VDSL) modem or optical network termination (ONT) can be installed as the customer premise equipment (CPE).

In one particular embodiment the integrated RG can be connected to the additional STBs 125 in the home via an internal network such as an Ethernet. Each STB has an associated RC 126 which provides user selections and data entry to the UI presented on an STB display 179 to control the IPTV selections and UI from the IPTV platform. Interaction with the control server and UI is also provided at the remove devices. UI interaction and associated home automation device state and information (such as video from a surveillance camera in the home) and data can also be sent to and from remote devices such as but not limited to a PMP 127, PDA 128, cell phone 129 and voice recognition 207 system, through the control server 138. Remote devices can send various types of data to the IC. Video from a mobile cell phone video camera or mobile video camera can be streamed through the control server to the IPTV server and sent to the ICA for display in a pop up window display area in the GUI display.

Subscriber activity data from a subscriber, including but not limited to IPTV UI inputs data, device states data, subscriber identification data, alerts data, IPTV channel selection data, IPTV control inputs data and IPTV data entry, is collected from each STB in a household. The subscriber activity data may be collected and transmitted from the RG to an IPTV server 106. Subscriber activity data may also include input to the UI at the IPTV server from a wireless device located outside of the home. In the illustrative embodiment an IPTV server 106 exists in each VHO. The subscriber activity data can be collected periodically at each IPTV server 106 or in real-time from each RG or other suitable communication gateway and stored in the database 134.

In the illustrative embodiment, each IPTV server 106 transmits the subscriber activity data to a single database 134 for global analysis and trending. Global alert messages can be sent, as business rules dictate, for global events such as severe weather, fire, terrorist threats, Amber alerts, and other global or regional events can be sent to IPTV subscribers based on analysis of subscriber activity data collected at the database 134. Thus a fire alert reported in one IPTV subscriber household can be reported to the fire department and neighboring households, including IPTV subscriber households. The database 134 may be a commercial database such as provided by Oracle running on a Sun Microsystems processor. Other processors and database Systems are suitable for use with the illustrative embodiment as well.

The IPTV server periodically collects the subscriber activity data from each VHO and stores it in the database. The IPTV server may also operate in real time to collect the data from the VHOs. The subscriber activity data from each VHO is pulled by the IPTV server periodically or can be collected in real time and relayed to the IPTV server. Real time data collection by the control server 138 enables real time data analysis for iterative configuration of the device state, global alert messages and dynamic management of content and home automation from the control server 138. A bank of servers 183 is provided at the VHO, including an IPTV server 106 and a control server 138.

Each of the servers in the bank of servers 183 includes a processor 130, a memory 132 coupled to the processor 130, a database 134, and access to UI 133. In a particular embodiment the memory 132 can include a computer program that is embedded in the memory 132 that can include logic instructions to perform one or more of the method steps described herein. Additionally the database 134 is coupled to the processor 130 containing the device control state 117.

The ICA 124, and STBs 125 may forward the subscriber activity data to the RG which in turn sends the subscriber activity data to IPTV server 106 via a communication path 121 between the VHO and an associated RG. Substantially all subscriber activity data including but not limited to content selection, device states, business rules and remote control activity is recorded as subscriber activity data at the IPTV server 106 database. The processor 130 may be implemented as a Sun Microsystems processor. The STB can contain a single microprocessor and memory, or may be implemented as multiple microprocessors and memories located at a single location or at several locations.

A downstream signal from the IPTV server 106 or control server 138 to a RG, display device or ICA includes but is not limited to UI data, device states data, and content data for display on the display device associated with the recipient client, such display 170 associated with ICA 124. An upstream signal through the RG from the home display device, RG or STB to the IPTV or control server includes but is not limited to events, device state and subscriber activity data including but not limited to channel selections, UI input and any other input from the RC, STB or other remote wireless device with access to the server. The device states data can be communicated directly to the control server 138 for conversion into an IPTV format UI and sent from the IPTV server to the client device as an IPTV UI. The UI shows device states as icons, pictures, graphics text, and can also display video from a remote device or a home controllable device in pop up windows 170 on the UI.

Figure 2:
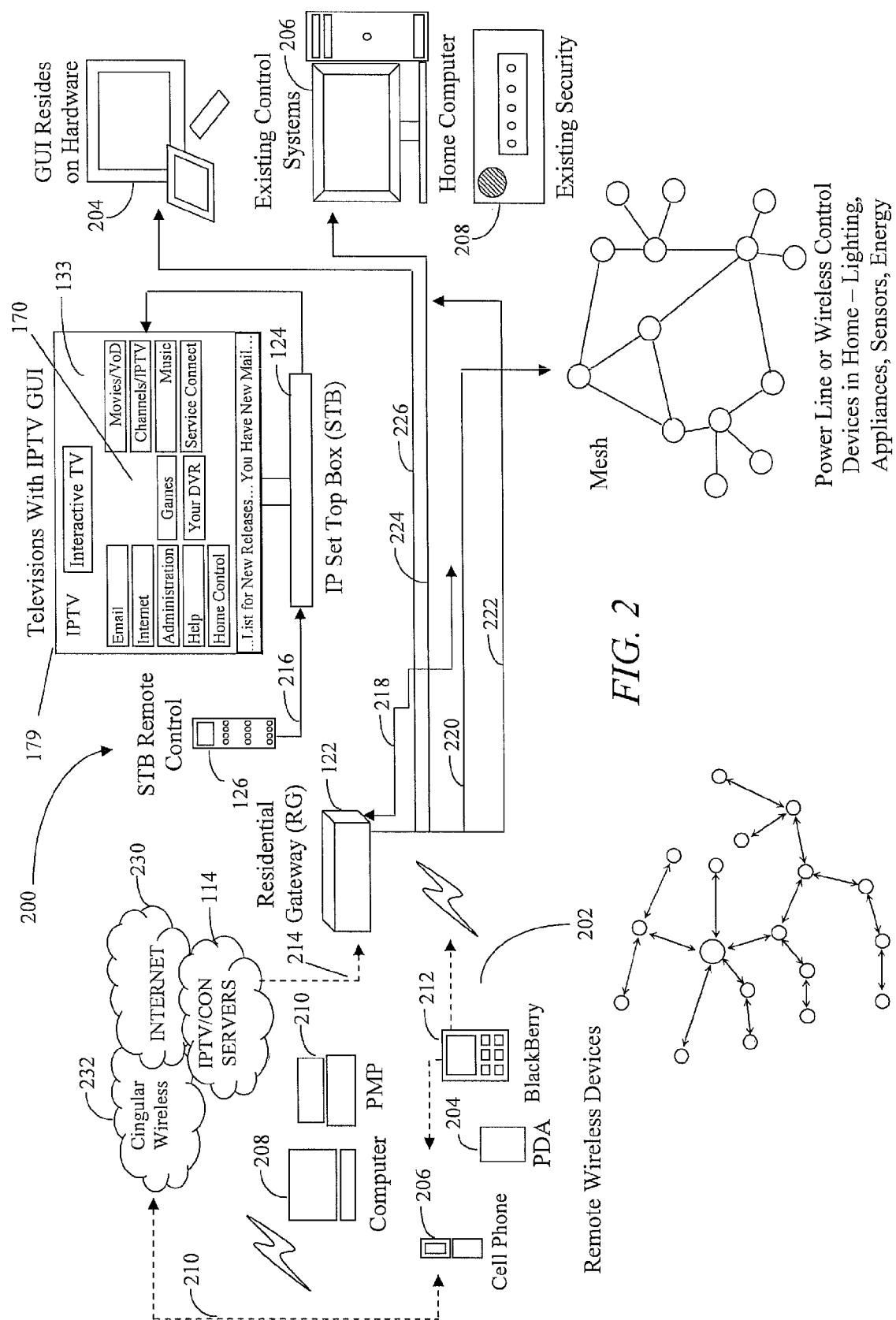
FIG. 2 is a schematic diagram depicting an illustrative embodiment showing a network of controllable devices connected to an IPTV network using an electrical power line for data transfer.

Turning now to FIG. 2 in an illustrative embodiment IPTV UI 133 data is provided from the IPTV server 106 to configure the device state 117 data and business rules data in the database 134. The device state data is subsequently sent from the control server to the ICA through the RG for controlling controllable devices on a wireless mesh network 202, a power line network 203, existing home security system 208, existing control system 204 or a home computer 206. The subscriber uses the IPTV UI data to interact with the IPTV server 106 and control server 138, which can be installed at the bank of servers 183 in the VHO 104. A subscriber uses a remote control 126 or remote wireless devices mobile email 202, PDA 204, cell phone 206, computer 208, or personal media player 210 to provide input to the UI data at the IPTV server 106 on the servers 183.

The cell phone 206 interfaces or communicates through a wireless network or wired network 232 to the control server 138. The remote wireless devices interface to the control server through wireless link 212. The IPTV server 106 interfaces with the RG 122 over a network link 214. The RG communicates with an ICA 124 over communication link 218. The RC 126 communicates with the ICA 124 over communication link 216. The RG communicates with the wireless mesh network and the power line network 202 over communication link 220. The RG communicates with existing home security over communication link 222. The RG communicates with the home computer system 206 over communication link 224. The RG communicates with the existing control system over communication link 226.

Figure 3:
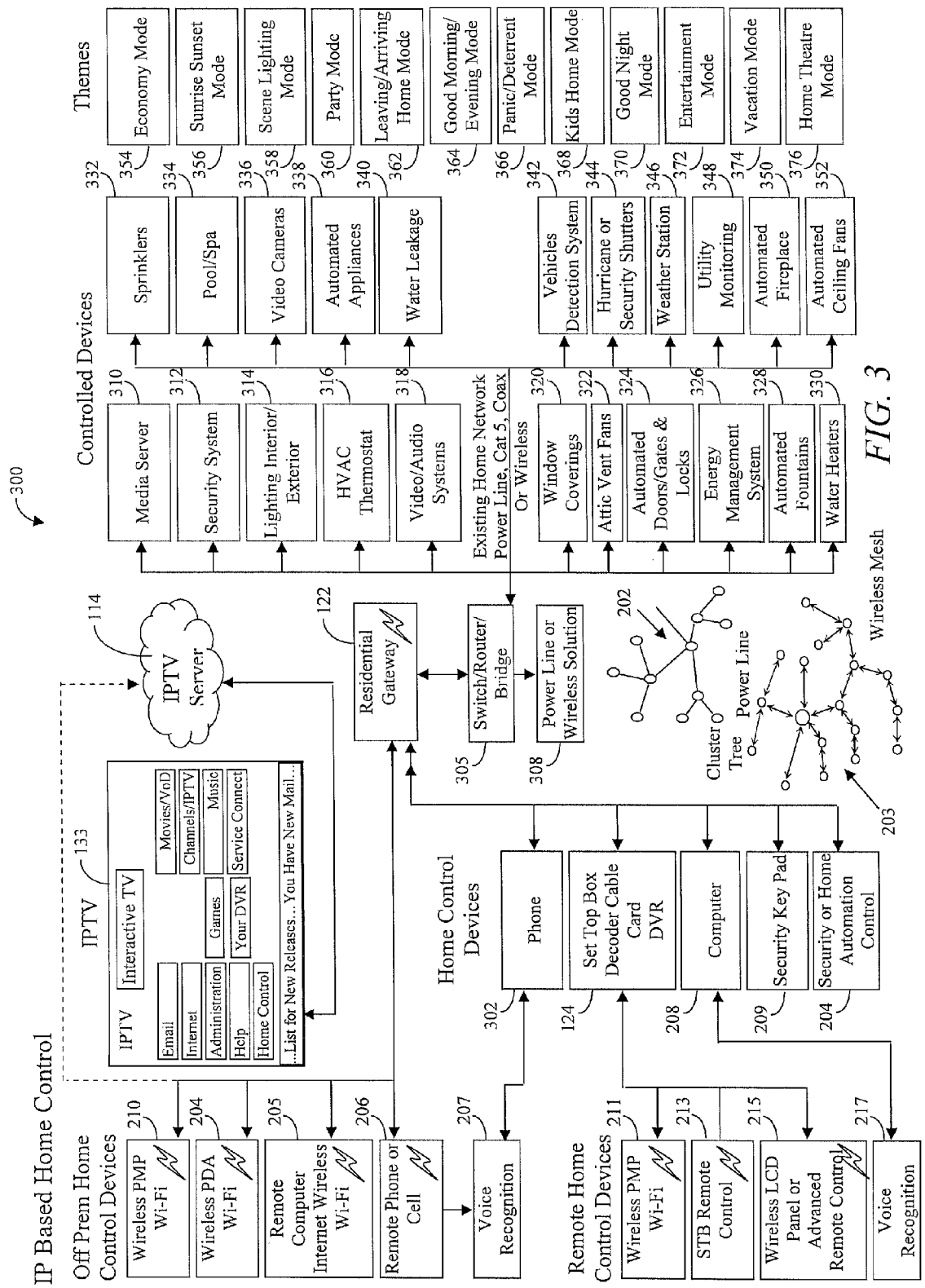
FIG. 3 is a schematic diagram depicting an illustrative embodiment showing a network of controllable devices connected to an IPTV network using an electrical power line for data transfer.

Turning now to FIG. 3, in an illustrative embodiment the IPTV UI 133 is accessible for viewing and input from all premise home control devices including but not limited to, wireless personal media player WIFI device 210, wireless PDA WIFI device 204, remote computer internet wireless WIFI device 205, and remote phone or cell phone 206. The UI is presented in a display 179. Pop up windows 170 can be created in the UI data and/or device state data to stream IPTV system and client generated electronic program guide data and client-generated video data or the UI data to a pop up window 170 section in the UI 133. A voice recognition system 207 in conjunction with a cell phone, or wireless telephone may also access a verbally announced version of the UI 133 to select appropriate control states and configure business rules to be applied to a device state and context. Controllable devices and remote control home devices proximate to the ICA may communicate with each other to communicate with the IC. Remote devices not in direct communication with the ICA communicate with the ICA through the control server and the IPTV server. The GUI can be verbally announced over a telephone and requested input received over the telephone through the voice recognition system. Remote home control devices also access a STB decoder or cable card 124 to access the RG and IPTV UI to select content or configure the device state 117 and business rules.

Remote control home devices can include but are not limited to a wireless personal media player (PMP) 211, STB remote control 213, and a wireless LCD panel or advanced remote control 215. A voice recognition system 217 is also provided to interface with the control server or computer 208 microphone or other audio input devices such as a telephone. The ICA 124 communicates with controllable devices 302 phone, set top box decoder cable card DVR 124, computer 208, security keypad 209, and security or home automation control 204. The ICA 124 also communicates with a switch/router/bridge 306 and a power line or wireless solution interface 308. The power line or wireless solution interface 308 communicates with the power line cluster tree 202 and the wireless mesh network 203. The switch/router/bridge 306 provides communications between the residential gateway and controllable devices.

The controllable devices 123 (home automation controllable devices) may include, but are not limited to a media server 310, security system 312, lighting interior/exterior 314, heating, ventilation and heating, ventilation and air conditioning (HVAC) thermostat 316, video/audio systems 318, window coverings 320, attic vent fans 322, automated doors/gates and locks 324, energy management system 326, automated fountain 328, water heaters 330, sprinklers 332, pools/spas 334, video cameras 336, automated appliances 338, water leakage 340, vehicle detection systems 342, hurricane or security shutters 344, weather station 346, utility monitoring devices 348, automated fireplaces 350, and automated ceiling fans 352.

The controllable devices can be configured to implement particular themes or aggregated device states according to a current context, current or scheduled content and the business rules stored in the database. Themes or device states can be associated with particular user content, time of day, and context. Context may include but is not limited to a combination of subscriber or event participant identification, global alert context from the database, time, current or scheduled content and other associated events. Associated events include but are not limited to arrival, departure, alarm state, calendar, weather, holiday, global events, etc. Themes consist of but are not limited to economy mode 354, sunrise sunset mode 356, scene lighting mode 358, party mode 360, leaving/arriving home mode 362, good morning/evening mode 364, panic/deterrent mode 366, kids home mode 368, good night mode 370, entertainment mode 372, vacation mode 374, and home theater mode 376. A global alarm state may override a theme to interrupt a muted setting where phones and TVs are turned off to send a phone and TV alert to a subscriber.

Figure 4:
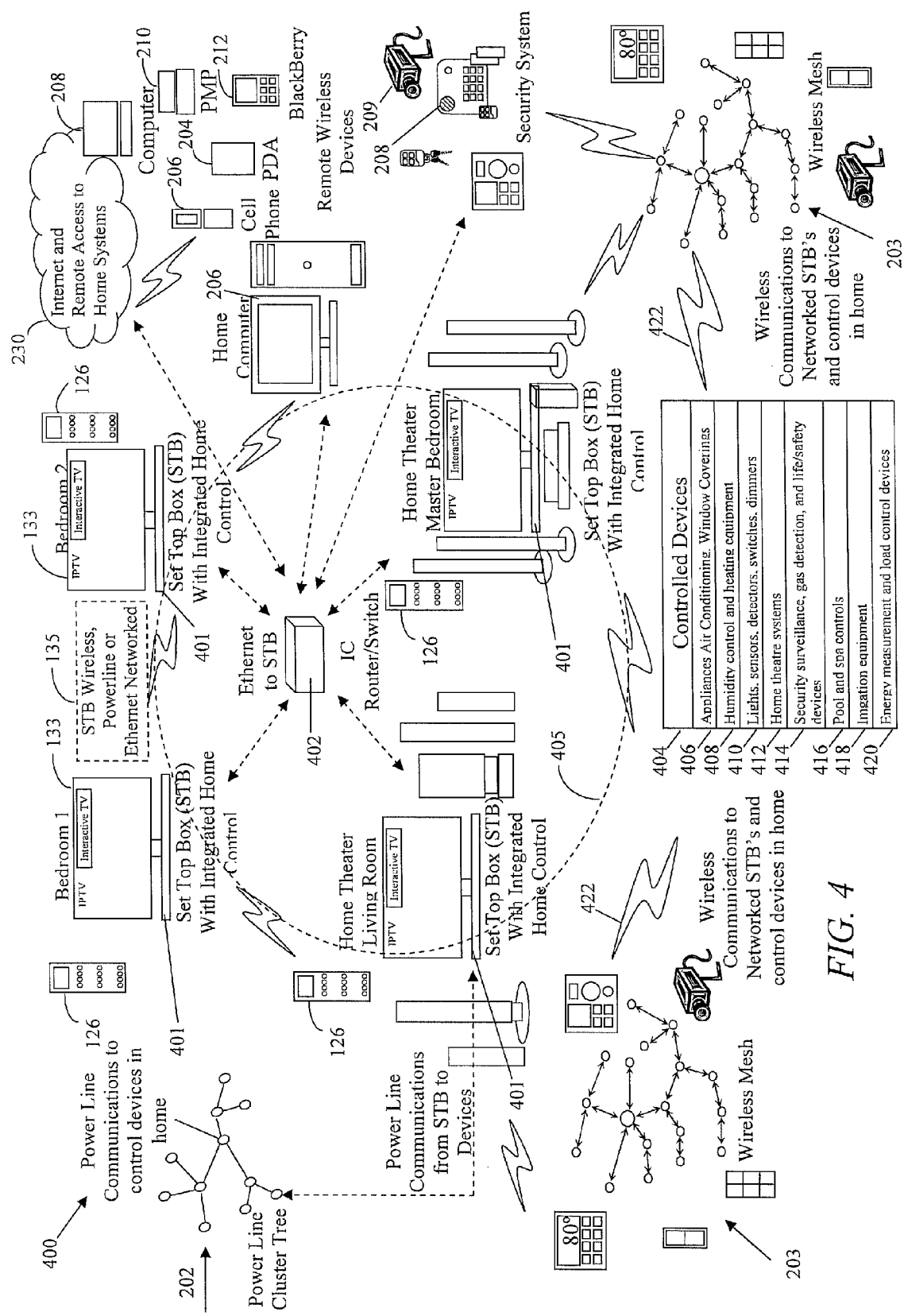
FIG. 4 is a schematic diagram depicting a particular illustrative embodiment showing a Set-top Box (STB) with integrated home and media controller in data communication with controllable devices in a home.

Turning now to FIG. 4 in a particular illustrative embodiment a router/switch device 402 communicates with the ICA 401 on an STB with integrated home control. The ICA 401 receives a device state from the IPTV network server 114 and communicates the control state to devices in the home on a wireless network, over power lines or an Ethernet network 405. The device state includes but is not limited to home theater control settings associated with home theater content.

Devices or utilities controlled by or communicated with by the STB or ICA include but are not limited to other STBs or ICs 401, a power line cluster tree 202, a wireless mesh network 203, the existing security system 208, home computer 206, and internet access to home systems 230 including home computer 208, personal media player 210, cell phone 206, PDS personal data assistant 204, and mobile email device 202. The wireless mesh network communicates to network STBs and controllable devices 123 in the home. The controllable devices 123 include but are not limited to appliances, air conditioning and window coverings 406, humidity control and heating equipment 408, light sensors, detector switches and dimmers 410, home theater systems 412, security surveillance, guest detection and lights/safety devices 414, pool and spa controls 416, irrigation equipment 418, and energy measurement and load control devices 420.

Figure 5:
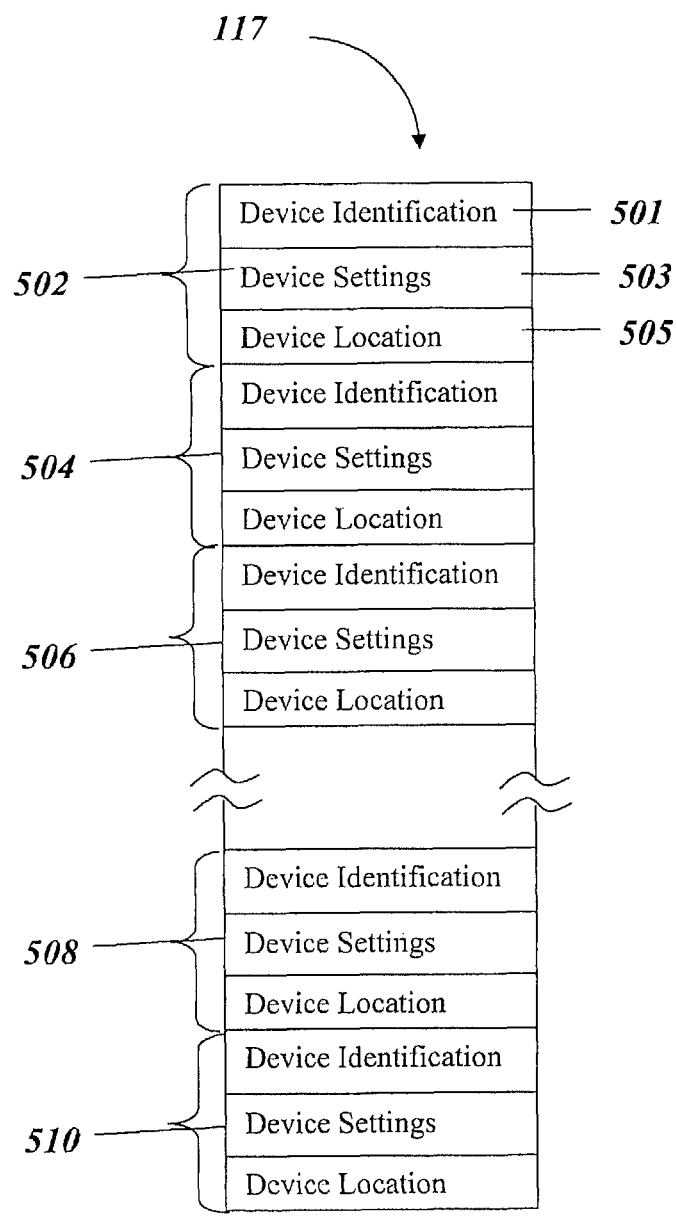
FIG. 5 is an illustration of a data structure for storing a device state in an illustrative embodiment.

Turning now to FIG. 5, FIG. 5 illustrates a data structure 117 for representing the configuration of a device state of the home automation controllable devices. A set of data structure fields is shown associated with the controlled devices represented in the device state. There can be multiple instances of each controlled device associated with a unique identifier in the data structure for uniquely representing multiple controlled devices in the device state.

Additional fields can be added to represent additional controlled devices. The device state is defined by fields in the data structure. Each device in a home is defined by a group 502 of device state definition fields. Each group 502, 504, 506, 508 of device state definition fields includes but is not limited to a device identification field 501 for storing device identification data, a device settings field 503 for storing device settings data for the device identified and a device location field 505 for storing data representing the device location. A device state is defined by a collection of the device state data in the data structure for all devices in a home having an ICA. The ICA in a particular illustrative embodiment performs video data distribution and context description. Device state data may include alert message data such as a global or security alert message stored in the device setting field 503 to be announced over an audio device or displayed on a display device.

Figure 6:
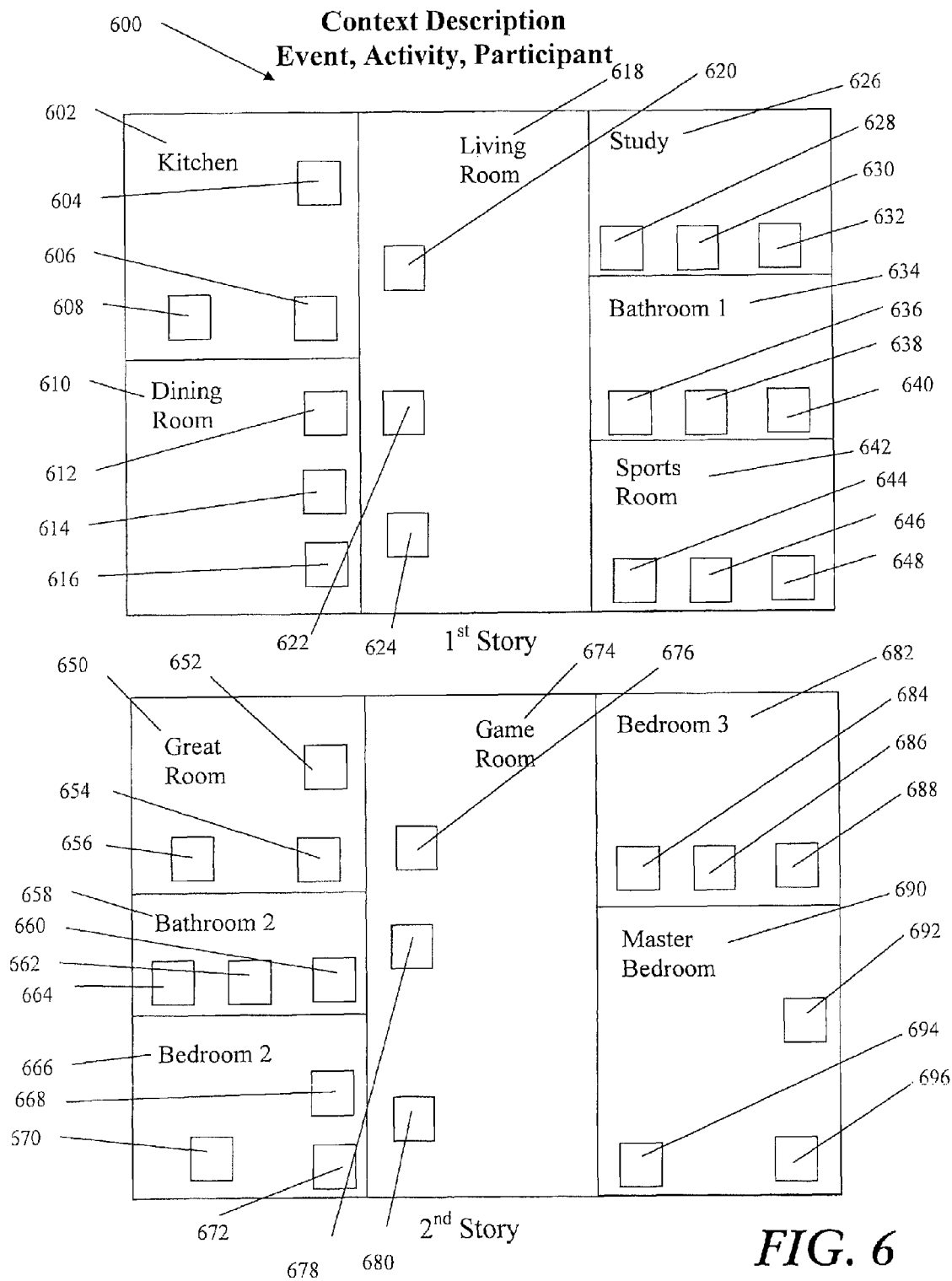
FIG. 6 is an illustration of an iconic representation of a device state for describing a context in terms of an event, an activity and a participant in a particular illustrative embodiment.

Turning now to FIG. 6, FIG. 6 is an iconic representation of the home control devices appearing in the UI. The icon representation is used to determine, represent and describe context in terms of an event, activity and participant. Home automation controllable devices are represented by as device icons. User input data to the UI can be performed by a RC and moving a cursor over the UI. The user input data is sent to the IPTV server or control server by the IC. User input to the ICA UI is accomplished placing a cursor on a device icon and right clicking, the device operational mode can be selected and stored in the device state data structure device setting field 503. Kitchen 602 controllable devices 604, 606, 608 represent but are not limited to devices such as microwave ovens, coffee pots, ovens, televisions, lights, phones, video cameras with built in motion detectors, etc. Dining room 610 controllable devices 612, 614, 616 represent but are not limited to devices such as televisions, lights, radios, phones, video cameras with motion detectors, etc. Living room 618 controllable devices 620, 622, 624 represent but are not limited to devices such as televisions, lights, stereos, DVD players, game systems, phones, video cameras with motion detectors, etc. Study 626 controllable devices 628, 630, 632 represent but are not limited to devices such as personal computers, lights, fax machines, printers, phones, etc.

As stated earlier, each CDA runs on a processor in data communication with a computer readable medium, both of which are integrated into some or all of the CDAs. Bathroom 1 634 controllable devices 636, 638, 640 represent but are not limited to devices such as radios, lights, televisions, phones, etc. Some or all of the controllable device include but are not limited to processor 130, memory 132 and database 134. Video camera controllable device further includes motion detector 135. Sports room 642 controllable devices 644, 646, 648 represent but are not limited to devices such as lights, radios, televisions, satellite systems, DVD players, phones, etc. Great room 650 controllable devices 652, 654, 656 represent but are not limited to devices such as lights, televisions, stereos, DVD players, phones, etc. Bathroom 2 658 controllable devices 660, 662, 664 represent but are not limited to devices such as lights, televisions, radios, phones, etc. Bedroom 2 666 controllable devices 668, 670, 672 represent but are not limited to devices such as lights, televisions, stereos, DVD players, satellite systems, phones, etc. Game room 674 controllable devices 676, 678, 680 represent but are not limited to devices such as lights, televisions, stereos, DVD players, satellite systems, phones, personal computers, etc. Bedroom 3 682 controllable devices 684, 686, 688 represent but are not limited to devices such as lights, televisions, stereos, DVD players, satellite systems, phones, etc. Master bedroom 690 controllable devices 692, 694, 696 represent but are not limited to devices such as lights, televisions, stereos, DVD players, satellite systems, phones, etc.

Figure 7:
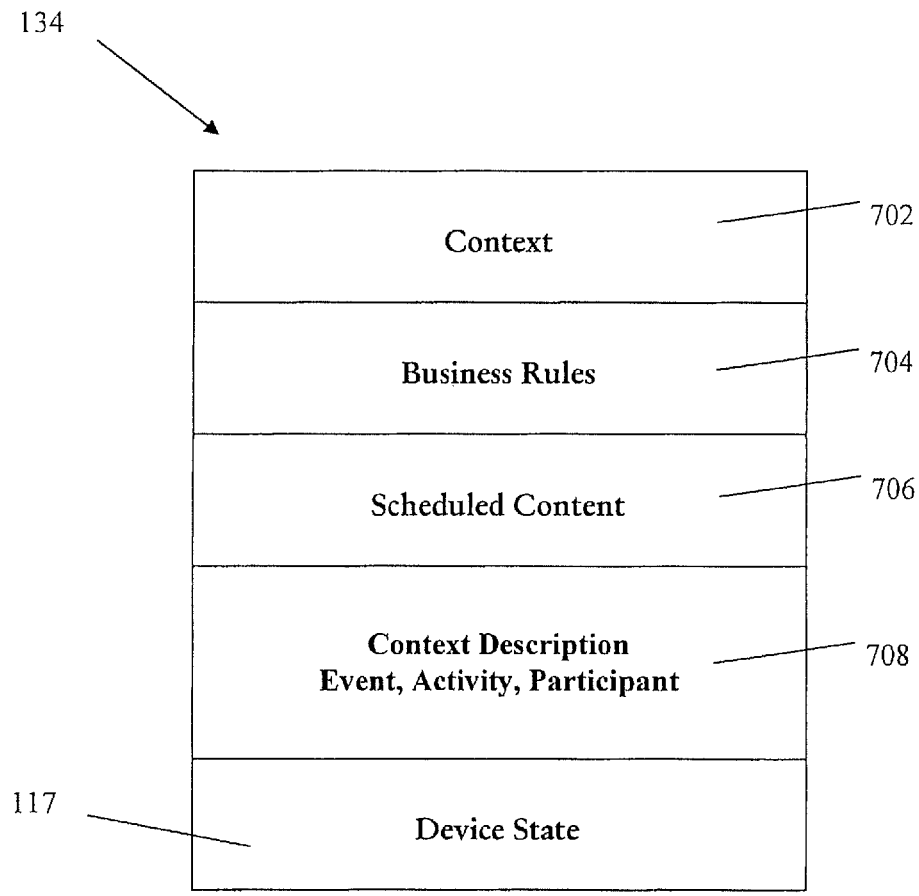
FIG. 7 is an illustration of a database for containing context data in an illustrative embodiment.

Turning now to FIG. 7, FIG. 7 is a schematic diagram of a database in accordance with a particular illustrative embodiment. An illustrative embodiment database includes but is not limited to context data at 702, business rules 704 data, scheduled content data 706, and the device state data 117. The database contains the business rules data accessible to a processor for configuration of the device state data 117. The device state data 117 may be associated with a particular theme. The theme may be associated with a particular context data 702. Thus, a subscriber may select a device state, configuring the lights and the control device, etc. in this house for a particular context (i.e. subscriber is dad; time Monday 8 pm, October, content is Monday Night Football). The context may also include parameters such as an event and event participant such as children arriving home from school. When the children enter the home their unique alarm code to the home security system identifies them as the kids arriving. If the time is between 3-5 pm, the home automation system through the ICA can lock out access to television and computer games to enforce children doing their homework. A context description is represented by data stored in the context description, event, activity and participant field 708 of the data base.

Figure 8:
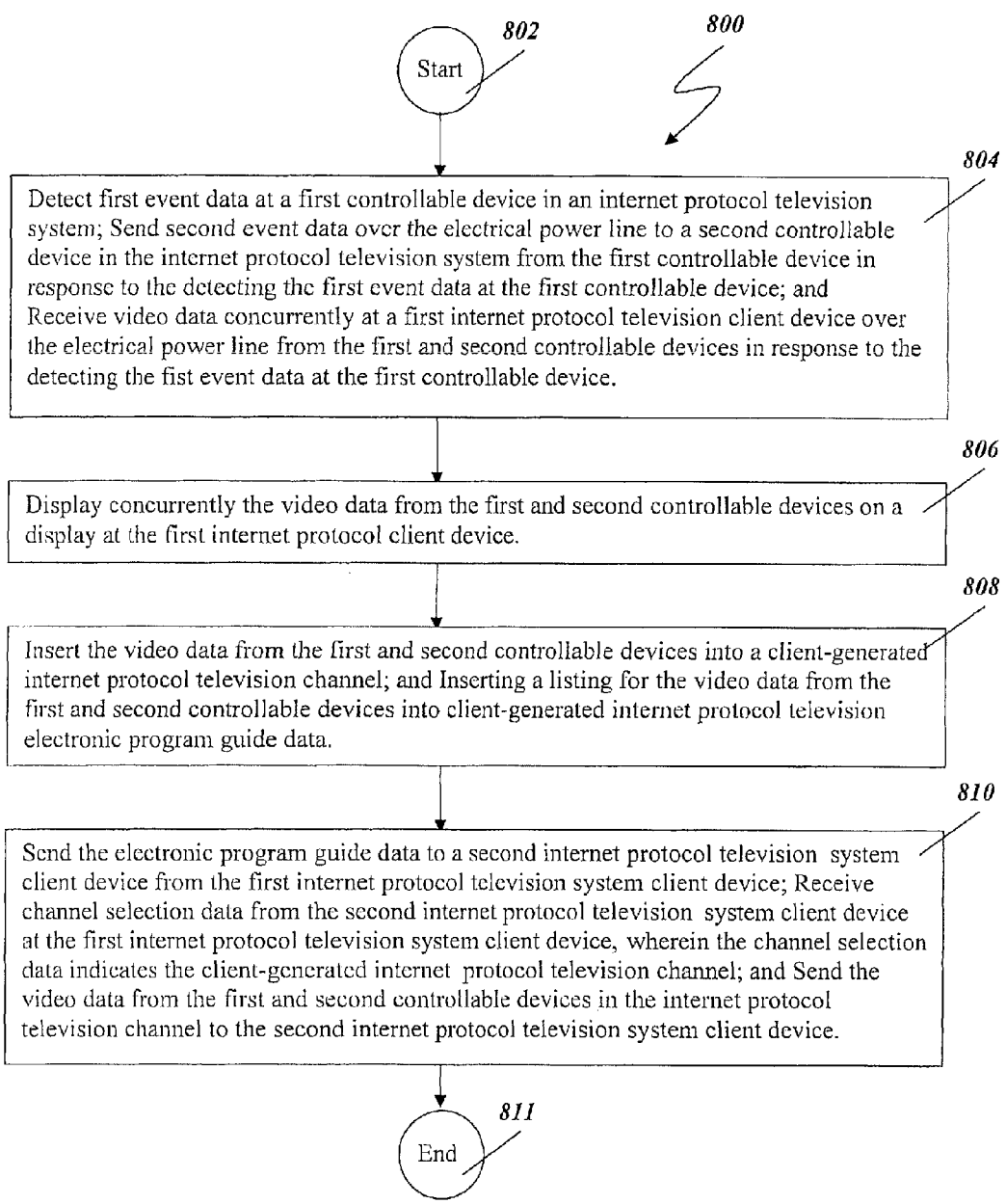
FIGS. 8-10 are flow charts illustrating methods performed in an illustrative embodiment.

Turning now to FIG. 8, FIG. 8 is a diagrammatic flow chart representation of a method performed by a computer system in accordance with a particular illustrative embodiment. The process begins at terminal 802 and proceeds to block 804. At block 804 an illustrative embodiment detects first event data at a first controllable device in an internet protocol television system and sends second event data over the electrical power line to a second controllable device in the internet protocol television system from the first controllable device in response to the detecting the first event data at the first controllable device.

For example, a kitchen video camera with built in motion detectors, senses or detects an event, such as motion in the kitchen. A CDA in the kitchen video camera sends data reporting the event to an ICA in a residential client device such as the STB and also send data reporting the motion event to other CDAs in other video cameras through out the house. The kitchen video camera CDA commands the kitchen video camera to go active and begin sending video camera data to the STB ICA. The kitchen video camera CDA further commands other video camera CDAs in rooms in the house adjacent to the kitchen go active and begin sending video data to the STB. When motion is detected in a second video camera CDA, the second CDA sends data reporting the motion event to the STB ICA and video cameras CDAs in rooms in the house adjacent to the second video camera CDA. Thus, a person walking through house is tracked on video camera data sent to the STB as they walk through the house.

In a particular embodiment the STB receives video data concurrently from the active video cameras at a first internet protocol television client device over the electrical power line from the first and second controllable devices in response to the detecting the first motion event data at the first controllable device. At block 806, an illustrative embodiment displays concurrently the video data from at least the first and second controllable devices, such as the video cameras in the kitchen and adjacent rooms and displays the video data concurrently on a display at the first internet protocol client device. At block 808, in a particular illustrative embodiment, the STB ICA inserts the video data from the first and second controllable devices into a client-generated IPTV channel and inserts a listing for the video data from the first and second controllable devices into client-generated IPTV electronic program guide (EPG) data. The STB ICA sends the client-generated IPTV channel data and IPTV EPG data to remote ICA in remote client devices for viewing, access and selection by remote client devices having ICAs and CDAs. A subscriber at a remote client device can request the data from the STB ICA and have the data sent to the remote client device over the IPTV network and view the client-generated IPTV channel data and IPTV EPG data on the remote client device.

Listings data for the client-generated IPTV channels are displayed in the EPG along with listings data for standard IPTV system generated channels (e.g., including but not limited to ESPN, ABC, CBS, CNN, etc.) At block 810, a particular illustrative embodiment sends the electronic program guide (EPG) data to a second internet protocol television system client device from the first internet protocol television system client device and receives channel selection data from the second internet protocol television system client device at the first internet protocol television system client device. In another particular embodiment, the channel selection data indicates the client-generated internet protocol television channel. A particular illustrative embodiment further sends the video data from the first and second controllable devices in the internet protocol television channel to the second internet protocol television system client device. In a particular illustrative embodiment, the process ends at terminal 811. In another illustrative embodiment, a CDA in a kitchen senses the motion event, that motion is sensed in the kitchen and sends report data to the STB ICA. A business rule in memory at the STB examines the context, that is, the time of day, that motion was detected in the kitchen and that the motion occurs during a security period such as when no one is supposed to be home or past a set bed time, according to a business rule. The CDA in the kitchen video camera also sends data describing the context (event time, activity and location) to the STB and a CDA in the parent's television which places message data describing the context of the event on the parent's television indicating motion has been detected in the kitchen. Video data from the kitchen video camera and video data from video cameras in rooms adjacent the kitchen are placed in the client generated IPTV channel and EPG at the STB and sent to the parents bedroom and remote client devices associated with subscribers in the residence.

In another illustrative embodiment, a CDA in a child's room senses an event, that the child has turned on the television and sends report data to the STB ICA and a CDA in the television in the parent's bedroom. A business rule in memory at the STB examines the context, that is, the time of day, the participant is the child and activity is turning on the television determines that the television is active past a set bed time for the child, according to a business rule. The CDA also send data describing the context (event participant, event activity and event location) to the CDA in the parent's television which places message data describing the context of the event on the parent's television indicating the child is watching television past the child's bed time.

Figure 9:
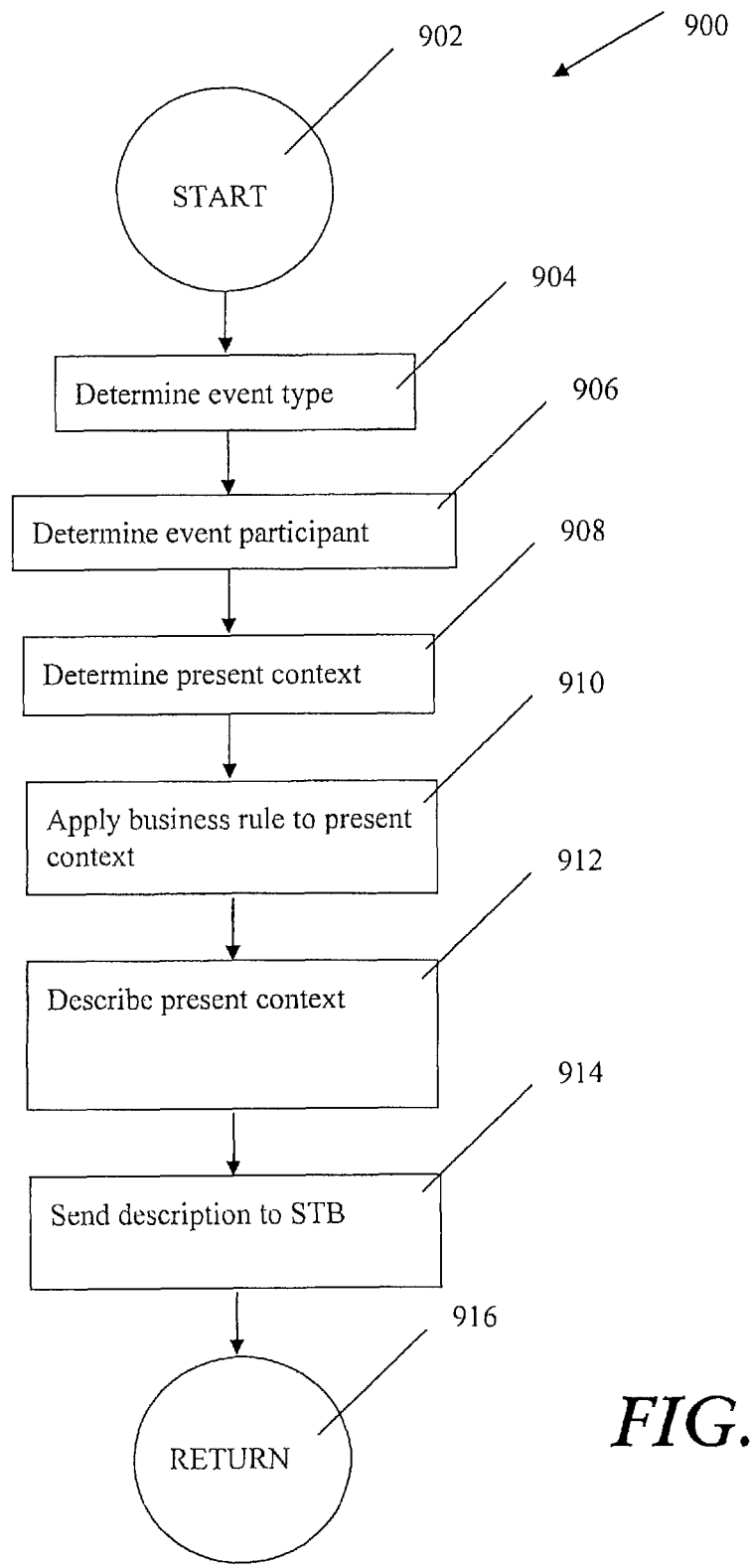

Turning now to FIG. 9, FIG. 9 is a diagrammatic representation of a method performed by a computer system in accordance with a particular illustrative embodiment. The scenario starts at block 902, determines event type at block 904, determines event participant at block 906, determines present context at block 908, applies a business rule to present context at block 910, describes the present context at block 912, and sends the configured device state to STB at block 914 and then returns at block 916. At block 806 an illustrate embodiment inserts the video data from the first and second controllable devices into a client-generated internet protocol television channel; and inserting a listing for the video data from the first and second controllable devices into client-generated internet protocol television electronic program guide data.

Figure 10:
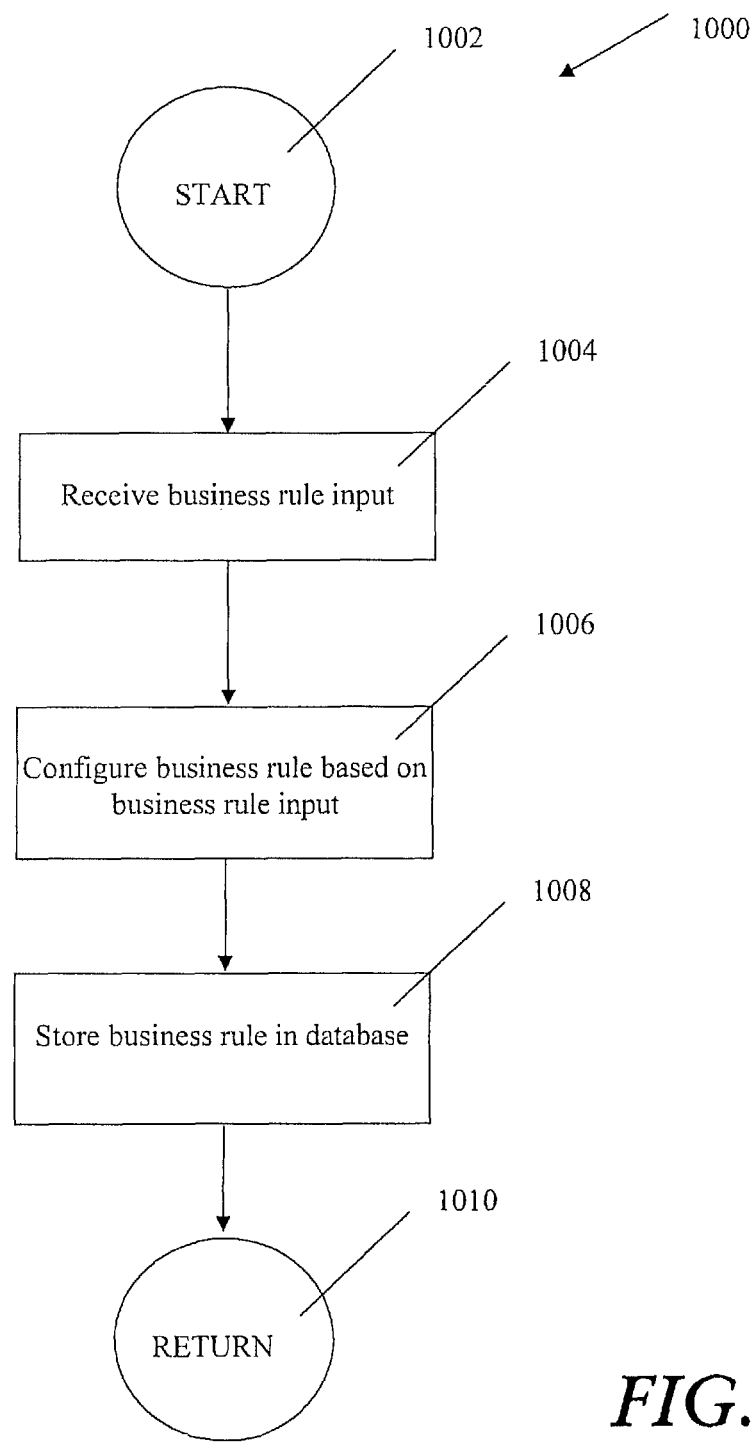

Turning now to FIG. 10, FIG. 10 is a diagrammatic flow chart representation of a method performed by a computer system in accordance with a particular illustrative embodiment. The illustrative embodiment scenario starts at 1002, receives business rule input at block 1004, configures business rule based on business rule input at block 1006, stores business rule in database at block 1008, and then returns at block 1010.

Figure 11:
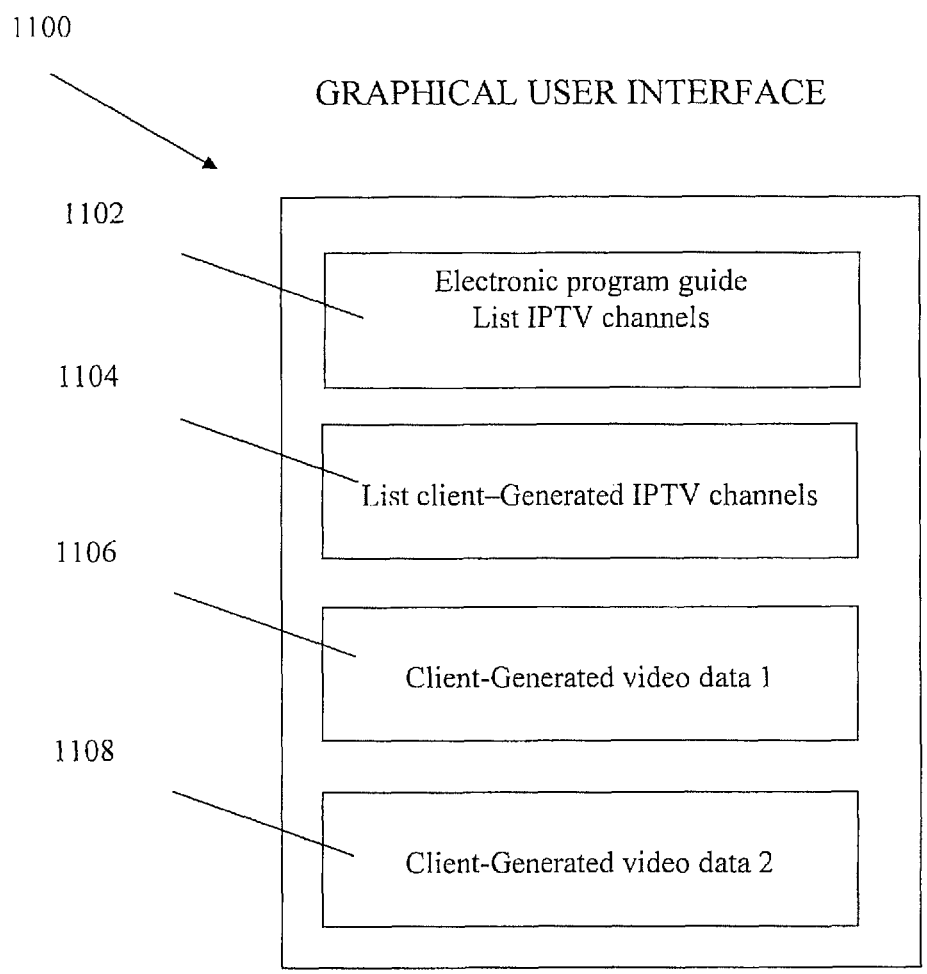
FIG. 11 is an illustration of a UI screen presenting UI data and an electronic program guide for selecting client-generated IPTV channel and client generated video data in an illustrative embodiment.

Turning now to FIG. 11, FIG. 11 is a diagrammatic representation of a UI screen in accordance with an illustrative embodiment of the present invention. The GUI of FIG. 11 allows a subscriber to vie an electronic program guide at block 1102, review a listing of client-generated IPTV channels 1104, view client-generated video data 1 1106, and view client-generated video data 2 in learn device state at block 1308. The business rules can be configured as entered via text input of spoken through the voice recognition system. An interpreter in the voice recognition system translates the spoken commands into executable business rules stored in the database. The device state can be configured using a GUI. The content can be selected using an IPTV GUI for content selection. The learn device state icon 1208 enables a subscriber to store the current device state for the home along with the context. The context may include but is not limited to a particular subscriber, content and time of day.

Figure 12:
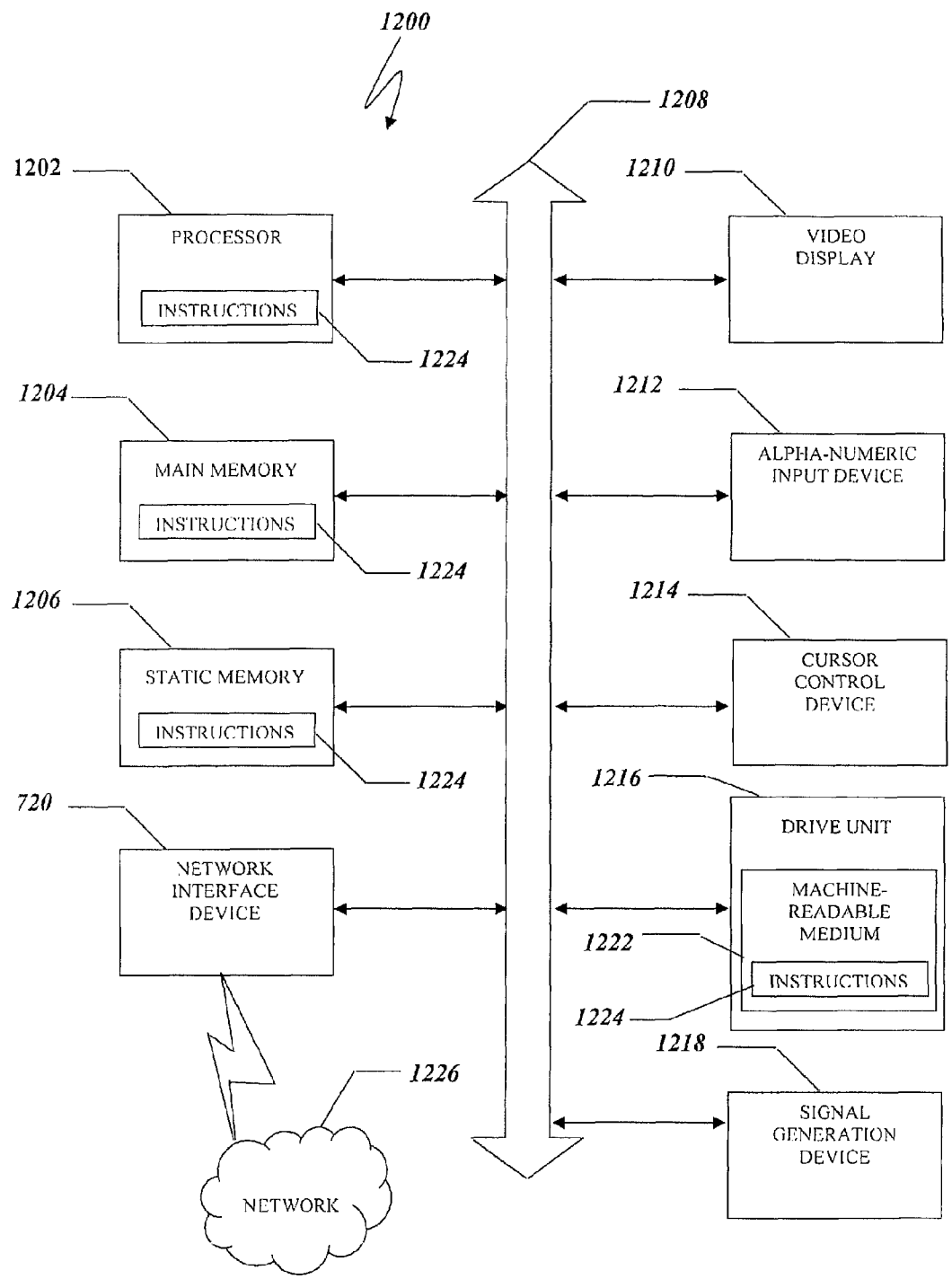
FIG. 12 is a diagrammatic representation of a machine in the form of a computer system within which a set of instructions, when executed, may cause the machine to perform any one or more of the methodologies of the illustrative embodiment.

Turning now to FIG. 12, FIG. 12 is a diagrammatic representation of a machine in the form of a computer system 1600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU), or both), a main memory 1204 and a static memory 1206, which communicate with each other via a bus 1208. The computer system 1200 may further include a video display unit 1210 (e.g., liquid crystals display (LCD), a flat panel, a solid state display, or a cathode ray tube (CRT)). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may, include a machine-readable medium 1222 on which is stored one or more sets of instructions (e.g., software 1224) embodying any one or more of the methodologies or functions described herein, including those methods illustrated in herein above. The instructions 1224 may also reside, completely or at least partially, within the main memory 1204, the static memory 1206, and/or within the processor 1202 during execution thereof by the computer system 1200. The main memory 1204 and the processor 1202 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1224, or that which receives and executes instructions 1224 from a propagated signal so that a device connected to a network environment 1226 can send or receive voice, video or data, and to communicate over the network 1226 using the instructions 1224. The instructions 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and, servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not, specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A non-transitory tangible computer readable medium, containing instructions embedded in the computer readable medium that when executed by a processor are useful in performing a computer program for distributing video data over an electrical power line, the computer program comprising:
instructions to send command data to a second controllable device in a first location and a third controllable device in a second location adjacent the first location, over an electrical power line from the first controllable device in response to detecting a first event data at the first controllable device;
instructions to receive first video data and second video data concurrently at a first internet protocol television client device over an electrical power line from a second and third controllable devices in response to the detecting a first event data in the first location at the first controllable device;
instructions to create at a first client end user device, a client created internet protocol television channel and insert the client created channel into an existing electronic program guide for the first and second video data; and
instructions to send the electronic program guide to a second client end user device for selection and display of the first and second video concurrently at a display for the second client end user device.

2. The medium of claim 1, the computer program further comprising:
instructions to display concurrently the video data from the first and second controllable devices on a display at the first client end user device client device.

3. The medium of claim 1, wherein the first controllable device and the second controllable device send video data to the first internet protocol client device in response to the detecting the first event data.

4. The medium of claim 1, wherein the first and second controllable devices are video cameras, the computer program further comprising:
instructions to receive a request from second client end user device for the channel;
instructions to insert at the first internet protocol client device, the video data received from the first and second controllable devices into the client-generated internet protocol television channel; and
instructions to insert client-generated listing data for the video data from the first and second controllable devices into a client-generated internet protocol television electronic program guide data.

5. The medium of claim 4, the computer program further comprising:
instructions to send the client-generated electronic program guide data to a second client device from the first internet protocol television system client device;
instructions to receive channel selection data from the second client device at the first internet protocol television system client device, wherein the channel selection data indicates the client-generated internet protocol television channel data; and
instructions to send the video data from the first and second controllable devices in the internet protocol television channel to the second internet protocol television system client device.

6. The medium of claim 4, wherein the client-generated listing data further comprises context statement data describing the first event data detected.

7. The medium of claim 6, wherein the context statement data further comprises event activity data indicating an event activity and event location data indicating an event location.

8. The medium of claim 7, wherein the context statement data further comprises data indicating event participant data indicating an event participant for the event activity and event location.

9. The medium of claim 4, the computer program further comprising: instructions to insert the client-generated electronic program data into an internet protocol television system-generated electronic program guide data, wherein the internet protocol television system-generated electronic program guide data is distributed to a plurality of client devices in the internet protocol television system and the internet protocol television system-generated electronic program guide data indicates programs provided by the internet protocol television system.

10. A system for distributing video data over an electrical power line, the system comprising:
a processor in data communication with a non-transitory computer readable medium; and
a computer program comprising instructions embedded in the computer readable medium, the computer program comprising:
instructions to send command data to a second controllable device in a first location and a third controllable device in a second location adjacent the first location over an electrical power line from the first controllable device in response to detecting first event data at the first controllable device;
instructions to create at the first client end user device, a client created internet protocol television channel and insert the client created channel into an existing electronic program guide for the first and second video data; and
instructions to send the electronic program guide to the second client end user device for selection and display of the first and second video concurrently at a display for the second client end user device.

11. The system of claim 10, the computer program further comprising:
instructions to display concurrently the video data from the first and second controllable devices on a display at the second client end user device.

12. The system of claim 10, wherein the first controllable device and the second controllable device send video data to the first internet protocol client device in response to the detecting a first event data.

13. The system of claim 10, wherein the first and second controllable devices are video cameras, the computer program further comprising:
instructions to receive a request from second client end user device for the channel;
instructions to insert at the first internet protocol client device, the video data received from the first and second controllable devices into a client-generated internet protocol television channel; and
instructions to insert client-generated listing data for the video data from the first and second controllable devices into client-generated internet protocol television electronic program guide data.

14. The system of claim 13, the computer program further comprising instructions to send the client-generated electronic program guide data to a second internet protocol television system client device from the first internet protocol television system client device;

instructions to receive channel selection data from the second internet protocol television system client device at the first internet protocol television system client device, wherein the channel selection data indicates the client-generated internet protocol television channel data; and instructions to send the video data from the first and second controllable devices in the internet protocol television channel to the second internet protocol television system client device.

15. The system of claim 13, wherein the client-generated listing data further comprises context statement data describing the event data detected.

16. The system of claim 15, wherein the context statement data further comprises event activity data indicating an event activity and event location data indicating an event location for the first event data.

17. The system of claim 16, wherein the context statement data further comprises data indicating event participant data indicating an event participant for the event activity and event location for the first event data.

18. The system of claim 13, the computer program further comprising instructions to insert the client-generated electronic program data into internet protocol television system-generated electronic program guide data, wherein the internet protocol television system-generated electronic program guide data is distributed to a plurality of client devices in the internet protocol television system and indicates programs provided by the internet protocol television system.

19. A method for distributing video data over an electrical power line, the method comprising:

sending command data to a second controllable device in a first location and a third controllable device in a second location adjacent the first location, over an electrical power line from the first controllable device in response to detecting a first event data at the first controllable device;

receiving first video data and second video data concurrently at a first internet protocol television client device over an electrical power line from a second and third controllable devices in response to the detecting a first event data in the first location at the first controllable device;

creating at a first client end user device, a client created internet protocol television channel and insert the client created channel into an existing electronic program guide for the first and second video data; and sending the electronic program guide to a second client end user device for selection and display of the first and second video concurrently at a display for the second client end user device.

* * * * *